(12) United States Patent
Mayerich et al.

(10) Patent No.: US 11,041,808 B2
(45) Date of Patent: Jun. 22, 2021

(54) SURFACE ABLATION LATHE TOMOGRAPHY (SALT) SYSTEMS AND METHODS FOR WHOLE ORGAN PHENOTYPING

(71) Applicant: University of Houston System, Houston, TX (US)

(72) Inventors: David Mayerich, Houston, TX (US); Jason Eriksen, Houston, TX (US)

(73) Assignee: UNIVERSITY OF HOUSTON SYSTEM, Houston, TX (US)

(*) Notice: Subject to any disclaimer, the term of this patent is extended or adjusted under 35 U.S.C. 154(b) by 1 day.

(21) Appl. No.: 16/488,785

(22) PCT Filed: Feb. 28, 2018

(86) PCT No.: PCT/US2018/020114
§ 371 (c)(1),
(2) Date: Aug. 26, 2019

(87) PCT Pub. No.: WO2018/160629
PCT Pub. Date: Sep. 7, 2018

(65) Prior Publication Data
US 2020/0033266 A1   Jan. 30, 2020

Related U.S. Application Data

(60) Provisional application No. 62/464,524, filed on Feb. 28, 2017.

(51) Int. Cl.
*G01N 21/64* (2006.01)
*G06T 7/55* (2017.01)
(Continued)

(52) U.S. Cl.
CPC .......... *G01N 21/6458* (2013.01); *G01N 1/06* (2013.01); *G02B 21/0036* (2013.01);
(Continued)

(58) Field of Classification Search
CPC ......... G01N 21/6458; G01N 1/06; G06T 7/55
See application file for complete search history.

(56) References Cited

U.S. PATENT DOCUMENTS

2006/0126061 A1   6/2006   Kreckel et al.
2008/0269370 A1   10/2008   Myung et al.
(Continued)

OTHER PUBLICATIONS

P. Amato, F. Pan, J. Schwartz, and T. M. Ragan, "Whole Brain Imaging with Serial Two-Photon Tomography," *Front. Neuroanat.*, vol. 10, Mar. 2016.

(Continued)

*Primary Examiner* — Hugh Maupin
(74) *Attorney, Agent, or Firm* — Winstead PC

(57) ABSTRACT

Imaging systems and methods, referred to herein as surface ablation lathe tomography (SALT), may be capable of providing whole organ tomography to provide 3D imaging. The system may provide a UV source that excites a sample, and a camera may capture imaging of fluorescent emission cause by the excitation. The tissue sample may be treated or stained with an imaging agent, such as fluorescent markers with fluorescently-tagged antibodies. The sample may also be infused with and/or embedded in paraffin wax. The tissue sample embedded in paraffin may be placed on a rotating mechanism that rotates, while the UV source excites a desired region and the camera captures imaging of a thin surface layer or shell of the sample. The system may also provide an ablation mechanism, such as a microtome blade or lathe, to ablate surface of the sample during rotation to allow imaging of subsequent layers of the sample. Once the sample has been fully imaged, a 3D map of the tissue sample, which may be an entire organ, can be provided.

20 Claims, 3 Drawing Sheets

(51) Int. Cl.
    *G01N 1/06* (2006.01)
    *G02B 21/00* (2006.01)
    *G02B 21/36* (2006.01)
    *G06T 15/04* (2011.01)
    *G01N 1/00* (2006.01)
    *G01N 1/04* (2006.01)

(52) U.S. Cl.
    CPC ......... *G02B 21/362* (2013.01); *G02B 21/367* (2013.01); *G06T 7/55* (2017.01); *G06T 15/04* (2013.01); *G01N 2001/002* (2013.01); *G01N 2001/045* (2013.01); *G01N 2021/6495* (2013.01)

(56) References Cited

U.S. PATENT DOCUMENTS

| | | |
|---|---|---|
| 2009/0137908 A1 | 5/2009 | Patwardhan |
| 2011/0117025 A1 | 5/2011 | Dacosta et al. |
| 2011/0224574 A1 | 9/2011 | Sadler et al. |
| 2015/0138532 A1 | 5/2015 | Goodman et al. |
| 2015/0323431 A1* | 11/2015 | Hall .................. G01J 3/00 356/72 |
| 2016/0077007 A1 | 3/2016 | Demos et al. |
| 2019/0301980 A1* | 10/2019 | Anderson .......... G01N 35/04 |

OTHER PUBLICATIONS

A. Li et al., "Micro-Optical Sectioning Tomography to Obtain a High-Resolution Atlas of the Mouse Brain," *Science*, vol. 330, No. 6009, pp. 1404-1408, Dec. 2010.

D. Mayerich, L. Abbott, and B. McCormick, "Knife-edge scanning microscopy for imaging and reconstruction of three-dimensional anatomical structures of the mouse brain," *J. Microsc.*, vol. 231, No. 1, pp. 134-143, Jul. 2008.

T. Ragan et al., "Serial two-photon tomography for automated ex vivo mouse brain imaging," *Nat. Methods*, vol. 9, No. 3, pp. 255-258, Mar. 2012.

P. S. Tsai et al., "All-optical histology using ultrashort laser pulses," *Neuron*, vol. 39, No. 1, pp. 27-41, Jul. 2003.

T. Zheng et al., "Visualization of brain circuits using two-photon fluorescence micro-optical sectioning tomography," *Opt. Express*, vol. 21, No. 8, pp. 9839-9850, Apr. 2013.

* cited by examiner

SURFACE ABLATION LATHE TOMOGRAPHY (SALT) SYSTEMS AND METHODS FOR WHOLE ORGAN PHENOTYPING

RELATED APPLICATIONS

This application claims the benefit of U.S. Provisional Patent Application No. 62/464,524 filed on Feb. 28, 2017, which is incorporated herein by reference.

STATEMENT REGARDING FEDERALLY SPONSORED RESEARCH

This invention was made with government support under grant Nos. 4 ROO LM011390-02 from the National Institute of Health (NIH)/National Library of Medicine (NLM) and RR140013 from Cancer Prevention Research Institute of Texas (CPRIT).

FIELD OF THE INVENTION

This invention relates to tomography systems and methods for whole organ phenotyping. More particularly, to Surface Ablation Lathe Tomography (SALT) systems and methods.

BACKGROUND OF INVENTION

The primary tool for tissue analysis in biomedical research and clinical analysis is histology, which relies on cutting thin slices of fixed and embedded samples. Traditional histology relies on cutting a tissue section for mounting on a glass slide, which is a complex manual task that results in significant tissue deformation. Groups, like the Allen Brain Institute, have refined these techniques and developed alignment algorithms to compensate for deformations. These sections are mounted on slides, stained, and imaged using a bright-field or fluorescence microscope. While this process is highly optimized, it limits imaging to two-dimensional cross sections that can easily miss critical structural and chemical features of a sample.

Three-dimensional (3D) imaging methods are routinely used in research, usually in the form of confocal and multi-photon microscopy. However, these techniques require scanning the sample with a focused laser beam, which is time-consuming and limited to thin (<1 mm) samples, since the excitation beam has to penetrate the surface. Several attempts have been made to increase tissue thickness by ablating tissue after imaging, including vaporizing the sample with focused laser pulses and cutting away tissue using a microtome. However, these techniques are too expensive and time consuming for routine imaging of large samples ($\approx 1$ cm$^3$) and whole organs. While the more recent use of SPIM can significantly reduce imaging time, the total tissue thickness is significantly reduced (<100 μm). Other options include tissue clearing, which can increase penetration depth. Increasing the light-sheet size to compensate results in a loss of axial resolution, which can potentially be mitigated through the use of Bessel and Airy beam optics. However, imaging depth is still limited by the objective working distance, and throughput is still limited by photobleaching from the scattered excitation beam.

In previous work, these time constraints were alleviated using a high-throughput imaging system that performed simultaneous physical sectioning and imaging. This technique, known as knife-edge scanning microscopy (KESM), allows imaging of 1 cm$^3$ samples at sub-micrometer resolution in several hours. This provided the first practical method for routine imaging of complete microvascular networks in high contrast and sub-micrometer spatial resolution (FIGS. 1A-1E, D. Mayerich, J. Kwon, C. Sung, L. Abbott, J. Keyser, and Y. Choe, "Fast macro-scale transmission imaging of microvascular networks using KESM," *Biomed. Opt. Express*, vol. 2, no. 10, pp. 2888-2896, September 2011). This method has also been used to image and reconstruct neural circuits using both traditional and fluorescent markers. However, KESM requires embedding samples in a hard polymer, which can take months. In addition, the instrumentation is expensive and difficult to set up and maintain in traditional research and histology laboratories due to the need for constant observation and routine maintenance.

The development of a novel tissue imaging system is proposed that provides practical data rates at low cost while alleviating the depth constraints inherent in existing optical imaging methods. The proposed technique, termed surface ablation lathe tomography (SALT), performs block-face imaging of embedded samples on a rotary stage followed by serial ablation of the tissue using an ultramicrotome blade. The central objective of this technique are to make whole-organ 3D imaging practical by (a) significantly increasing the acquisition speed of 3D images and (b) eliminating depth constraints inherent in existing imaging methods.

SUMMARY OF INVENTION

In one embodiment, an imaging system may be capable of providing whole organ tomography and may be referred to herein as surface ablation lathe tomography (SALT). The system may provide a UV source that is utilized to excite a sample, and a line-scan camera may capture imaging of fluorescent emission cause by the excitation. In some embodiments, the tissue sample may be treated or stained with an imaging agent, such as fluorescent markers. In some cases, fluorescently-tagged antibodies or other agents may be covalently linked to the tissue using a linker, such as glutaraldehyde. In some embodiments, it may be desirable to embed the tissue in an imaging or supporting matrix prior to imaging. As a nonlimiting example, the sample may be dehydrated and infused with paraffin wax, and embedded in a paraffin cylinder or block. Further, in another nonlimiting example, the tissue may be optically cleared and embedded into an optical transparent matrix such as a hydrogel. The tissue sample embedded in the imaging or supporting matrix may be place on a rotating mechanism that may rotate at a constant rate, while the UV source excites a desired region and the camera captures images. The system may also provide an ablation mechanism, such as a microtome blade or lathe, to ablate the surface of the sample block during rotation to allow further imaging of underlying layers. Once the sample has been fully imaged after several turns, 3D imaging of the entire tissue sample may be provided.

In some embodiments, SALT imaging may be performed to image an entire organ or tissue sample, which may be treated or stained with an imaging agent. Fluorescently-tagged antibodies or other agents may be covalently linked to the organ or tissue sample using a linker, such as glutaraldehyde. Further, the sample embedded in a supporting matrix. For example, the sample may be dehydrated and infused with paraffin wax, and embedded in a paraffin cylinder or block. In other embodiments, the tissue may be optically cleared and embedded into an optical transparent matrix such as a hydrogel. The tissue sample embedded in the imaging or supporting matrix may then rotates, such as by a rotating mechanism that rotates at a constant rate, while the UV source excites a desired region and the camera captures images. After one full 360° turn, the camera captures a shell of the surface or outer layer of the organ or tissue. While the cylinder is being rotated and images are captured, a thin outer layer of wax and/or tissue that has been imaged may be ablated or removed, which removes the imaged shell so that subsequent underlying layers can be imaged as well. When cylinder has made sufficient turns to gather a complete set of shells, the shells may be merged together to provide a 3D image or map of the organ or tissue sample.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figures 1A, 1B, 1C, 1D, 1E:
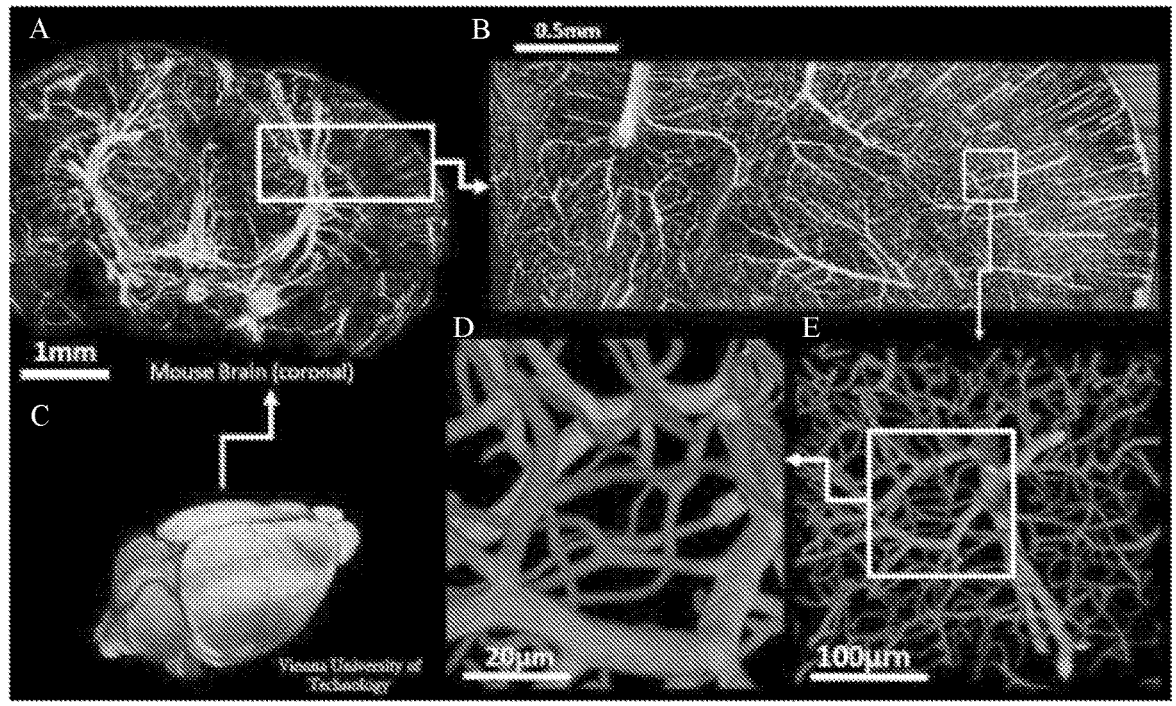
FIGS. 1A-1E show whole brain imaging of microvascular networks using KESM.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Biomedical researchers continue to face challenges confronting complex diseases that affect the tissue phenotype in a myriad of different ways. Neurodegenerative diseases alter the surrounding tissue through complex changes in structure, protein distribution, and the underlying chemistry. The symptoms of these diseases can also vary significantly across patients at the microscopic scale. These changes are difficult or impossible to quantify accurately with thin sections available using standard histology, and the limited volumes acquired using confocal or single plane illumination microscopy (SPIM).

For example, current models of Alzheimer's disease suggest significant changes in structural and chemical distribution of cellular components within the brain. For that reason, Alzheimer's disease researchers are currently in need of a comprehensive roadmap for exploring the brain at the microscopic scale. This includes microvascular changes, as well as the formation of neurofibrillary tangles (NFTs) and amyloid beta (Aβ) plaques. However, the broad effects of these changes across the entire brain are impossible to quantify using traditional imaging, and currently form a critical gap in our understanding of Alzheimer's disease.

There have been several attempts to address the possibility of whole-brain imaging for exploring neural connectivity and gene expression. However, these techniques are time consuming and impractical for routine whole-brain phenotyping. Fast approaches have been proposed for microvascular reconstruction; however, these systems are difficult to operate and limited to a single chemical component.

An ideal imaging method would provide a 3D map for a tissue sample or organ, while also incorporating the ability to explore samples in three-dimensions using multiple chemical labs. While three-dimensional methods such as confocal microscopy provide some structural context, these techniques are extremely slow and impractical for whole-brain phenotypes.

Systems and methods for whole organ phenotyping are discussed herein, which may be referred to herein as surface ablation lathe tomography (SALT). In some embodiments, principles of ultraviolet (UV) excitation may be utilized to collect and image of a sample surface region. For example, the sample may be positioned on a rotating mechanism that allows the surface layer of the sample to be imaged during one rotation, which may be characterized as shell or surface layer of the sample. Additionally, a lathe mechanism (e.g. microtome blade) may be utilized to ablate the surface layer of imaged tissue/wax to expose deeper underlying layers that may be subsequently imaged. As such, SALT imaging gathers imaging of several shells or surface layers of the sample that are subsequently removed by the lathe mechanism after imaging. Further, it is clear that by gathering shells of the entire tissue sample, a 3D representation of the entire tissue sample, which may be an entire organ, has been imaged. Thus, the shells of the entire tissue sample may be merged to provide a complete 3D map of the tissue sample.

While these systems and methods may have some similarities to previously proposed serial ablation techniques, there are two major advantages: (1) ultraviolet surface excitation, which increases imaging throughput, and (2) lathe-based ablation, which is far more stable than traditional ultramicrotome sectioning. The required mechanical and optical components also make the instrumentation far less expensive than scanning confocal and multi-photon imaging systems. Our proposed technique also overcomes limitations in tissue thickness commonly associated with single plane illumination microscopy (SPIM). As a nonlimiting example, one goal is to enable researchers to characterize comprehensive whole-brain phenotypes on a routine basis with micron-scale spatial resolution and multi-protein specificity. In some embodiments, SALT may provide quick imaging of large biological samples at the scale of whole organs at submicrometer resolution, and/or with chemical specificity.

It should be noted that the drawbacks of histology processes are avoided entirely by imaging un-cut tissue, dramatically simplifying reconstruction and eliminating the need for manual mounting procedures. Cut tissue is simply disposed of as it falls off of the specimen block, allowing for continuous and automated imaging of large samples while removing theoretical constraints on tissue thickness. This can potentially allow entire organs to be cut and imaged without human interaction. In fact, in some embodiments, larger paraffin cylinders can store multiple samples for simultaneous imaging.

While a comparison to standard imaging is impossible for large samples due to the inherent depth limitations of traditional techniques, the improved systems and methods discussed herein are expect to provide at least a 10-100× increase in data throughput. Calculations suggest that a standard research laboratory equipped with a SALT imaging system can collect data for more than 10 rodent Alzheimer's disease experiments within a week. In addition, the improved systems and methods discussed herein may allow samples to be imaged in a single pass without human intervention.

Design and Construction of Salt Imaging Systems: Prior Work

FIGS. 1A-1E (prior art) show whole brain imaging of microvascular networks using KESM. Brain tissue is perfused with a high-contrast dye, such as India ink, and sequential sections are cut and simultaneously imaged to create a three-dimensional data set of stacked two-dimensional slices. Since imaging and cutting are performed simultaneously, minimal alignment is required. However, as noted previously, KESM requires samples to be embedded in a hard polymer and expensive instrumentation that is difficult to setup. New technology, known as microscopy with ultraviolet sectioning excitation (MUSE), allows block face imaging of fresh tissue by the excitation of multiple fluorophores simultaneously at the block face. A sample is excited using an ultraviolet (UV) source, causing labeled components of the tissue to emit fluorescent light at their multiple respective wavelengths. This light is collected using a standard objective and color camera. The key feature in MUSE is that UV light penetration is limited to ≈5 µm into the sample, allowing an image of the tissue surface to be collected in parallel without the need for laser scanning. Notably, the limited penetration allows a sharp image to be taken of the tissue surface.

While MUSE offers fast image collection for standard samples, these images are effectively limited to a thin 2D planar slice at the tissue surface and MUSE does not provide 3D imaging. However, the improved systems and methods allow for the collection of a thin shell or surface layer representing the tissue surface. The improvements forms the basis of our imaging system, which collects serial images of this tissue shell while continuously ablating the surface to remove imaged tissue and expose deeper layers.

Principles and Advantages

One principle behind SALT imaging systems and methods discussed herein is fluorescence excitation. Many common fluorophores have excitation peaks in the UV range that trigger their traditional emission frequencies. UV is not generally used for excitation since modern microscopes rely on glass optics that does not effectively transmit short wavelengths. However, UV sources are relatively inexpensive, and optical components are readily available in the form of fused silica lenses. The main advantage utilized in MUSE is that UV penetration in tissue is limited to ≈5 µm under direct illumination. This is comparable to the thickness of a traditional histology section. However, the application of oblique illumination can significantly reduce the excitation thickness, particularly since the low wavelength of UV allows for tighter optical focusing.

Figure 2A:
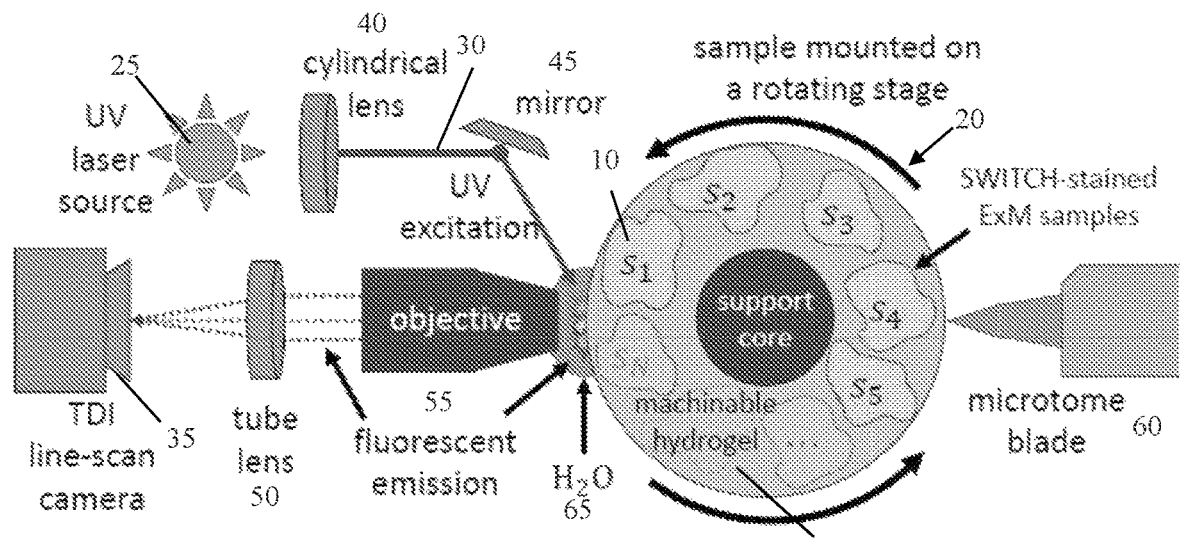
FIG. 2A-2B shows illustrative embodiments of the concept of SALT imaging.
Figure 2B:
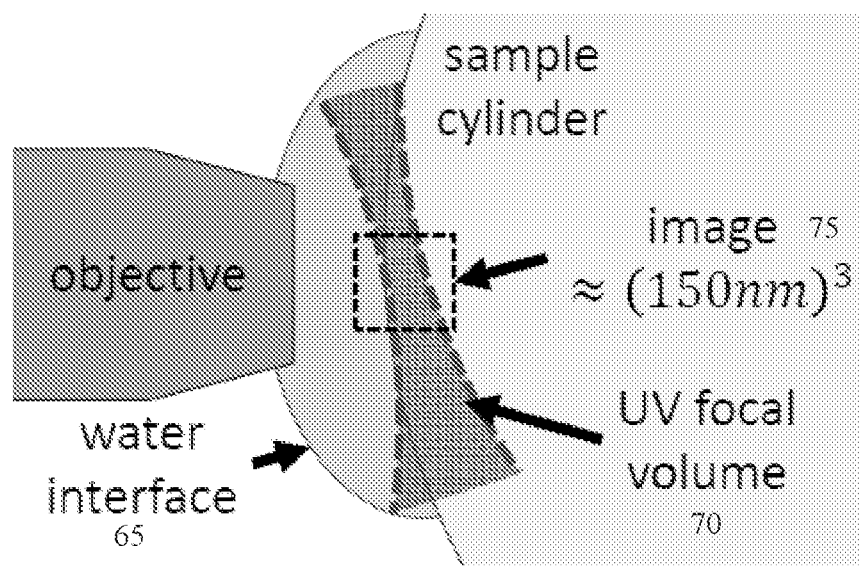
Figures 3A, 3B, 3C, 3D, 3E:
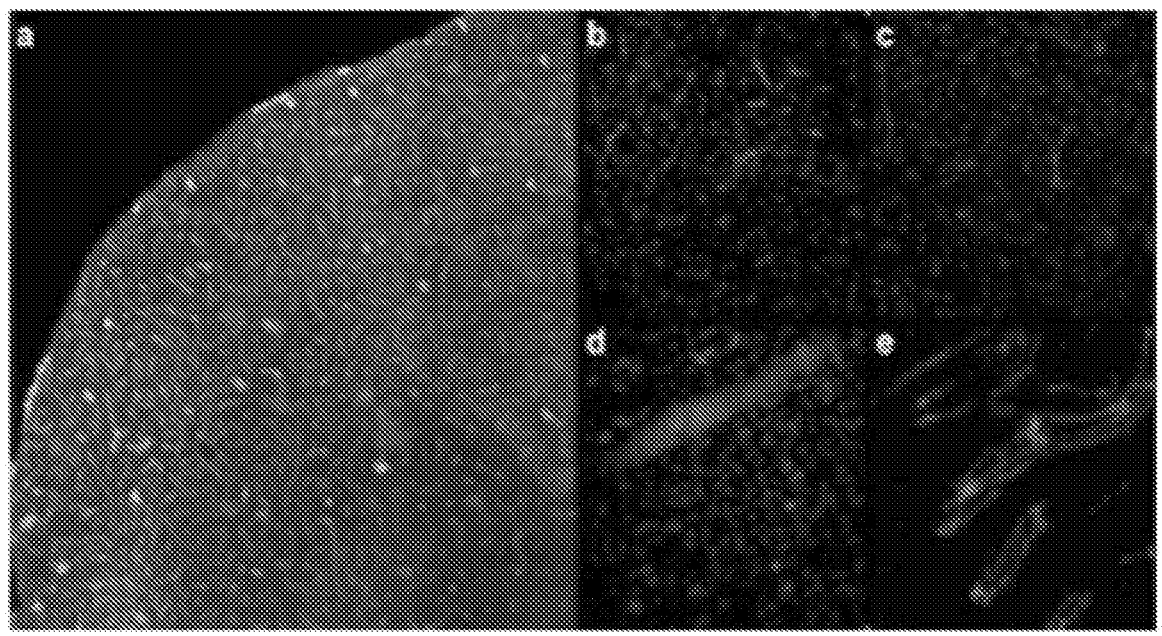
FIGS. 3A-3E show examples of detectible neurovascular proteins in fixed cortex unmasked using enhanced AR. a. collagen IV. b. claudin 5; c.occludin; d. SMA; e.vWF.

The SALT imaging systems and methods discussed herein may utilize the principles of UV excitation to collect and image the surface of a sample. FIGS. 2A-2B shows illustrative embodiments of the concept of SALT imaging. In some embodiments, a tissue sample 10 may be treated or stained with an imaging agent, such as fluorescent or other agents, to aid the imaging process. In some embodiments, the tissue sample(s) 10 is embedded in an imaging or supporting matrix 15 and mounted on a rotary mechanism or stage 20. Notably, the samples may include several tissue samples $S_1, S_2 \ldots S_n$ that can be imaged simultaneously. In some embodiments, the sample embedded in the supporting matrix may have a round, circular, or cylindrical shape. The imaging or supporting matrix material may be any material that is suitable for lathing, such as a wax, paraffin wax, or hydrogel. As a nonlimiting example, the sample may be dehydrated and infused with paraffin wax, and embedded in a paraffin cylinder, circle, block, or any other suitable shape. In another nonlimiting example, the tissue may be optically cleared and embedded into an optical transparent matrix, such as any suitable hydrogel (e.g. LR White), hydrophilic non-ionic telechelic macromonomer, ionizable monomer, or combination thereof. In some embodiments, a UV laser source 25 may provide a UV beam 30 to excite a surface region of the sample, such as by providing the beam to optional imaging accessories like a collimator or lens 40 and scanning mirror 45. It should be noted that the sample embedded in the matrix may be treated or stained with an agent for imaging, such as fluorescent materials, dyes, lectins, and/or other agents, prior to being embedded in the imaging or supporting matrix. As a nonlimiting example, the sample may be stained with fluorophores with excitation peaks in the UV range to aid the imaging. Additionally, SWITCH (system-wide control of interaction time and kinetics of chemicals) tissue processing or stochastic electrotransport processing techniques may be utilized. A camera 35 focused, such as with optional imaging accessories like a lens 50 or objective 55, on a region of the sample being excited by the UV beam may capture images of the surface of the sample. The sample may be rotated while it is excited by the UV source and additional images may be captured. In some embodiments, the camera may be part of a MUSE system, selective plane illumination microscopy (SPIM) system, or expansion microscopy (ExM) system. As a nonlimiting example, in a prototype the stage encoder triggered firing of a color line-scan camera, allowing the simultaneous acquisition of three fluorescent channels (ex. Alexa 568, 488, 405) excited simultaneously at the tissue sample surface. As another nonlimiting example, SPIM imaging may be performed at an oblique angle may be utilized. It should be noted that SPIM imaging may prefer an imaging or supporting matrix that is optically transparent, such as any suitable hydrogel.

As the sample (e.g. paraffin cylinder) is mounted on the rotary stage, the cylinder can be rotated to image the surface layer or a shell of the sample or block-face imaging. Once the sample has rotated 360°, the images captured form a representation of the surface layer of the sample. In some embodiments, the sample may be rotated at a constant velocity selected to minimize overlap of successive images. Additionally, as the cylinder is rotated, an ablation mechanism, such as microtome blade, lathe, laser, or other ablation means, may remove the surface layer of the wax and/or tissue, after imaging. This ablation reveals the next underlying layers or surface layers, and allows deeper underlying layers to be exposed to ultraviolet light, thereby alleviating depth constraints traditional UV imaging. As such, rotation, UV excitation, and image capturing can be repeated to image the underlying layers or shells of the sample to completely image the remaining sample, thereby allowing a 3D image of the sample to be obtained. As a nonlimiting example, a diamond ultramicrotome blade may be used to ablate imaged tissue, thereby exposing deeper underlying layers for imaging. Once imaged, the surface and underlying layers or shells of the entire sample are gathered; the imaged layers or shells can be utilized or assembled to provide a 3D image, map, or representation of the entire sample or organ.

The samples may be treated with any suitable imaging agent and embedded in any suitable supporting matrix. As a nonlimiting example, this embodiment is SWITCH-stained and embedded in a hydrogel. Further, as a nonlimiting example of suitable imaging accessories, the UV source to a cylindrical lens and mirror. Some embodiments of SALT imaging systems and methods, including those discussed above and further herein, may optionally provide a liquid interface 65, such as water, between the sample(s) embedded in the supporting matrix and the camera. As a nonlimiting example, the interface may be provided between an objective and the sample. FIG. 2B provides an enlarged view of the interface 65 provided between an objective and the sample. The UV source and any accompanying imaging accessories cause excitation of a UV focal volume 70, and the camera captures an image 75 of at least a portion of the UV focal volume. As discussed previously, rotation, excitation, image capture, and ablation of the sample continues to allow images of the surface layer and underlying layers to be captured.

The improved SALT imaging will avoid the tissue deformation drawbacks of traditional histology entirely by imaging un-cut tissue, dramatically simplifying reconstruction and eliminating the need for manual mounting procedures. Cut tissue is simply disposed of as it falls off of the specimen block, allowing for continuous and/or automated imaging of large samples while removing theoretical constraints on tissue thickness. In some embodiments, the sample may be rotated at a constant velocity. It shall be understood that surface circumference changes as the sample is ablated. Thus, in some embodiments, the rotation velocity or frequency of image capture may be adjusted during the imaging process, such as after a full 360° turn. In some embodiments, approximately 5 µm of the sample embedded in the supporting matrix may be removed by the blade as the sample rotates. This can potentially allow entire organs to be cut and imaged without human interaction. In fact, in some embodiments, larger paraffin cylinders can store multiple samples for simultaneous imaging.

Design Specifications

FIGS. 2A-2B illustrate embodiments of the concept of the SALT imaging as discussed previously. It shall be apparent to one of ordinary skill in the art that the various features, embodiments, variations, and/or options discussed above are also applicable the corresponding 3D imaging system discussed further herein. Tissue samples are embedded in a traditional paraffin wax and mounted to a rotating mechanism or stage. The rotating mechanism may include a stage for the sample, a securing the sample, and any suitable rotary means. Nonlimiting examples of rotary means may include motorized or manually driven gears, belts, chains, or the like that cause the stage and sample to rotate about a central axis. To capture a 3D image of the entire sample or cylinder, surface layers of shells are image captured during UV exposure as tissue is subsequently ablated to expose deeper underlying layers and repeat the process, thereby alleviating depth constraints.

Figures 4A, 4B, 4C:
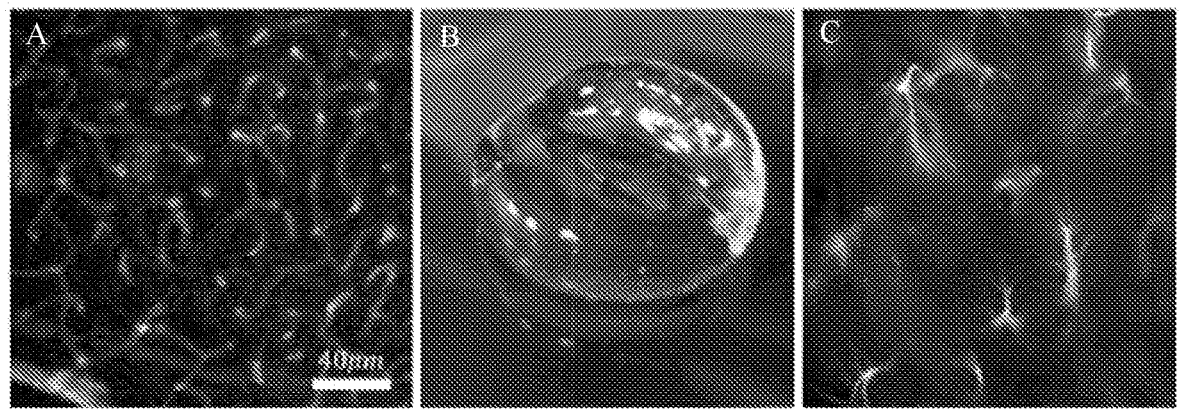
FIGS. 4A-4C respectively show (A) cortical blood vessels stained using FITC-lectin after paraffin processing; (B) ExM-compatible strain-hardened IPN hydrogel using PEGDA and acrylamide mix; and (C) ExM image of cortex stained for GFAP at 20×.

A nonlimiting prototype system may be discussed further to demonstrate the basic principles of SALT imaging. However, it shall be understood that the prototype system is merely an illustrative embodiment that is nonlimiting. The first step of the SALT process is to treat or stain blocks of tissue samples or entire organs 10 with an imaging agent, such as a suitable fluorophore or the like. For example, the sample may be stained using a recently published technique called SWITCH, which allows antibodies to penetrate and uniformly stain very large blocks of tissue, or stochastic electrotransport processing. To allow antibody retention in the tissue during paraffin processing, a simple post-fixation technique was developed using a low concentration of a sterilization agent and preservative (e.g. glutaraldehyde) to covalently link bound fluorescently-tagged antibodies to the tissue. As shown in FIGS. 4A-4C, this technique efficiently preserves signal. Additionally, the sample may also be embedded in a supporting matrix 15. As a nonlimiting example, after linking, the tissue may be dehydrated, such as in ethanol and xylene, and infiltrated with paraffin wax. The uniformly stained and paraffin embedded sample can then be incorporated into a machinable paraffin block for SALT imaging.

Once the sample 10 embedded in paraffin 15 has been formed, the paraffin block may be placed on the rotary mechanism 20 for imaging. A UV source 25 may provide a UV beam 30 that may cause fluorescent excitation of the tagged sample in a region subject to excitation. A camera 35 may capture the fluorescent response in the region as the sample is rotated. In some embodiments, multiple cameras may be utilized to increase throughput. Further, in some embodiments, optional excitation or imaging accessories, such as collimators 40, scanning mirrors 45, lens 50, objectives 55, or the like may be provided. It shall be apparent to one of ordinary skill in the art that the camera 35 captures images of a shell of the sample corresponding to an outer or surface layer of the sample embedded in the supporting matrix after 360° of rotation. While the block is rotated, an ablation mechanism (e.g. microtome blade, lathe, laser, or other means) 60 may remove the outer layer of the paraffin/sample after imaging to reveal underlying layers, which are also subsequently excited, imaged, and removed during continued rotation. From the repeated excitation, imaging and removal of the surface and underlying layers, the camera is able to capture imaging of several shells of the sample. Once the entire sample has been imaged and cut away by the lathe, the several shells can be merged or assembled to provide a three-dimensional image or map of the sample.

As discussed previously, the camera may be part of a MUSE, SPIM, or ExM system. In some embodiments, the rotary mechanism may operate at a constant velocity. In some embodiments, the sample may be rotated at a constant velocity. In some embodiments, the rotation velocity or frequency of image capture may be adjusted during the imaging process, such as after a full 360° turn. In some embodiments, approximately 5 µm of the sample embedded in the supporting matrix may be removed by the blade as the sample rotates. In some embodiments, the agent for imaging is a fluorescent treatment or staining material, fluorescent material, dye, lectin, or other agent. In some embodiments, the supporting matrix is a wax, paraffin wax, or hydrogel. In some embodiments, the hydrogel may be a non-ionic telechelic macromonomer, ionizable monomer, or combination thereof. In some embodiments, the shape of the embedded sample may be round, circular, cylindrical, or the like. In some embodiments, the system allows for continuous and/or automated imaging.

Figure 5:
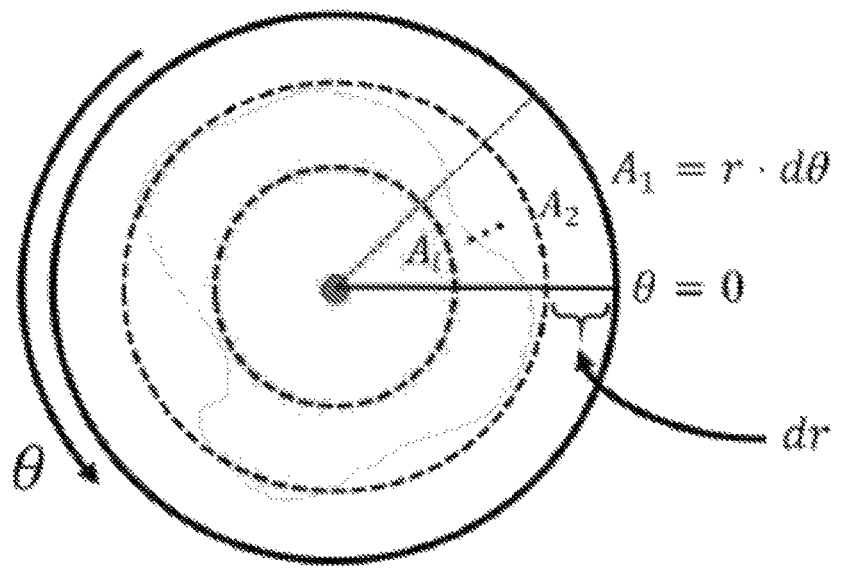
FIG. 5 shows cylinder mapping and resolution of SALT.

FIG. 5 shows an illustration of the sample and parameters of interest. In some embodiments, the sample is collected in a cylindrical ($\theta$, r, z) coordinate system. In some embodiments, the rotational ($\theta$) sampling rate or angular velocity set is to allow quality image capture of the shell without gaps, minimal to no overlap, or poor sampling. As a nonlimiting example, the velocity may be set such that diffraction-limited sampling is performed. In some embodiments, spacing between adjacent pixels in the $\theta$ direction is determined based on the objective numerical aperture (NA) and emission frequency for the labels. For example, the angular velocity should be selected to allow the sample to travel a desired distance in accordance with the time at which the system can excite and capture subsequent images—otherwise the imaging of the shell may have gaps or significant overlap. As a nonlimiting example, it is expected that 250-500 nm spacing can be maintained between points on the sample surface layer. As shown, dr represents the thickness that is ablated during rotation of the sample. $A_1$, $A_2$, ... $A_i=r*d\theta$ or a distance spanned during rotation at a specified angular velocity. It should be apparent that this may make it desirable to adjust the angular velocity as the sample is imaged and ablated. As imaging occurs closer to the rotational axis (r→0), the angle between camera firing and rotation speed are respectively increased to maximize throughput and minimize redundant data collected. Once the entire sample is imaged, the data set is re-sampled into a Cartesian grid, making it more amenable to image processing using standard techniques. While many techniques are available for re-sampling, cubic interpolation is a nonlimiting example of technique that may be sufficient if the sampling rate is optimal.

As a nonlimiting example, the prototype imaging system utilizes a Dalsa Pirhana Color 4 k 17 kHz line-scan camera (Teledyne-Dalsa, Inc.) that provides a theoretical throughput of 4096×17600 Hz≈17 megapixels/s at 3 colors per pixel, resulting in a throughput of approximately 216 megabytes per second (Mb/s). While throughput in most imaging systems is limited by fluorophore emission intensity, our design allows us to use high excitation intensities with little concern for photobleaching, since the tissue will be ablated during the imaging process. It is believed a peak throughput can be achieved that is limited only by camera data rate. Other embodiments of SALT systems can further accelerate throughput by the use of multiple high-throughput cameras.

As a nonlimiting example, the prototype system used an Aerotech MPS75GR (Aerotech, Inc.) rotary stage with 1 arcsecond encoder for a maximum sampling rate along $\theta$ of ≈4.85×10$^{-6}$ radians (FIG. 5). FIG. 5 shows cylinder mapping and resolution constraints of SALT are similar to those used in micro computed tomography (micro-CT) and optical coherence tomography (OCT) imaging systems. After imaging, samples will be mapped to a Cartesian grid where any traditional post-processing methods can be applied. Assuming diffraction-limited resolution is desired, which is approximately 220-255 nm based on available Alexa fluorophores, the prototype can support a sample approximately 220 nm/4.85×10$^{-6}$≈45 mm in radius (90 mm in diameter). If peak throughput can be achieve, imaging 1 cm$^3$ of tissue (approximately the size of a whole mouse brain) with three antigen targets at a resolution comparable to traditional histology would require≈16 hours. This time would be comparable to KESM imaging, require minimal post-processing, and is completely automated. While a comparison to standard imaging is impossible for large samples due to the inherent depth limitations of traditional techniques, at least a 10-100× increase in data throughput is expected. It is calculated that a standard research laboratory equipped with a SALT imaging system can collect data for more than 10 rodent Alzheimer's disease experiments within a week. The only constraint in the prototype is a 3-marker limit, but each sample can label different antigen targets. In addition, all experiments can easily fit within the same 90 mm diameter cylinder allowed by the prototype, allowing all samples to be imaged in a single pass without human intervention.

Characterize Vascular Changes in an Alzheimer's Disease Mouse Model: General Experimental Approach In Alzheimer's disease (AD), amyloid-beta accumulation contributes to the development of specific alterations in blood vessel diameter, density, branching, and tortuosity. SALT microscopy may be employed to rapidly image whole brains of AD models and wild-type mice to validate the effectiveness of this platform. APdE9 mice, a transgenic mouse line that accumulates significant amyloid deposits by 12 months, and non-transgenic age-matched siblings at 3, 6 and 12 months of age will be sacrificed, processed and stained for neurovasculature, embedded into a support matrix, and imaged using SALT. The resulting images will be segmented using the FARSIGHT Toolkit to generate digital maps of the vascular networks of individual mouse brains.

The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Construction of Comprehensive Neurovascular Map Using Salt

Rationale, Justification and Feasibility.

SALT microscopy allows for a comprehensive and quantitative comparison of microvascular features across the same regions of multiple brains. Significant architectural differences are anticipated, such as changes in vascular branching, thinning, or the appearance of tortuosity due to vascular remodeling, and may be easily detectable in these extracted features. Feature extraction will identify specific regions of interest (ROIs) for detailed multiplex analysis.

A comprehensive characterization of neurovasculature is difficult, but several novel approaches have been developed to address this task. A critical gap in the field is a lack of robust immunohistochemical approaches to detect degenerative changes in formaldehyde-fixed tissues, since formaldehyde fixation masks a large number of vascular epitopes. Consequently, investigators who routinely characterize blood vessel morphology will typically infuse fluorescently labeled compounds, like dextran or tomato lectin, into an intact circulatory system to stain the vasculature. Dye infusion is technically challenging and rate limiting, requiring an intact vasculature system. In addition, such methods do not improve detection of vascular proteins that are masked by aldehyde-based fixatives, or allow for staining of postmortem tissues. These approaches offer only limited characterization of the neurovasculature.

To address this issue, a recently publication discusses an enhanced antigen retrieval (AR) protocol that improves the sensitivity of immunohistochemical (IHC) detection, enhancing the detection of a broad number of neurovascular proteins, such as collagen IV (FIGS. 3A-3E show examples of detectible neurovascular proteins in fixed cortex unmasked using enhanced AR. a. collagen IV. b. claudin 5; c.occludin; d. SMA; e.vWF.), that are typically not detectable by IHC when preserved with formaldehyde. Enhanced AR is broadly compatible with many antibodies and facilitates multiplex fluorescence staining. This allows studying changes in protein expression at a level that is previously inaccessible to investigators interested in vascular changes in postmortem tissue.

The main challenge addressed by SALT imaging is to develop an approach to efficiently identify changes in the neurovascular network. This network comprises a complex 3D architecture with the brain, containing a rich series of spatial associations between glial, neuronal, and vasculature elements. Since amyloid accumulation will affect vascular remodeling in specific regions of the CNS, relying on small volumes of brain tissue selected ad hoc limits our ability to quantify these changes in a useful way. By applying quantitative L-measurement analytical approaches to the raw SALT data, attempts to quantitatively identify regions of interest for further exploration are possible.

Optimization of Whole Organ Staining.

A major limiting factor associated with whole organ staining is the minimal diffusion-limited penetration of dyes and antibodies. Deep tissue techniques, such as KESM, are limited by the depth of staining and rely on infusion of dyes or endogenous expression of fluorescent proteins. Several new techniques such as SWITCH tissue processing and Stochastic Electrotransport overcome these limitations. SWITCH allows for scalable uniform tissue staining by fixing and clearing tissue, and using a simple reaction approach that allows antibodies and dyes to penetrate under non-binding conditions, followed by a change in solutions to induce binding. SWITCH is compatible with the majority of antibodies, but is relatively slow for whole organs. In contrast, stochastic electrotransport uses a rotating electrical current to accelerate passive diffusion processes of electromobile molecules, including dyes and antibodies, into tissue. Stochastic electrotransport is also broadly compatible with a variety of antibodies, but works within hours on whole organs. It has been validated that SWITCH works reproducibly for staining the neurovasculature, and it is also believed that stochastic electrotransport may also be compatible with SALT imaging (further validation is ongoing). Further comparison of these two techniques is ongoing. Once the tissue has been stained, labeled antibodies can be covalently bound to targets by exposure to a low (0.1%) concentration of glutaldehyde allows for retention of common fluorophores during paraffin infiltration. FIGS. 4A-4C demonstrates excellent retention of signal in a cortical tissue sample stained using SWITCH, embedded in paraffin, and then deparaffinized and imaged using conventional microscopy. In addition to validating staining methods, the selection of common fluorophores may be optimized for compatibility with paraffin processing and UV, and further testing paraffin compositions for compatibility with SALT processing may be conducted.

Whole Brain SALT Imaging and Feature Extraction.

In prior discussion above, the neurovasculature may be characterized in non-transgenic and APdE9 mice using a multiscalar imaging approach utilizing whole-brain microvascular imaging with SALT. A region-based approach utilizing expansion microscopy (ExM) imaging may also be conducted. Regions of interest will be identified by first imaging the whole mouse brain microvascular system from control and transgenic mice using SALT. Images will be acquired at sub-micrometer lateral resolution and 5 μm axial resolution (slice thickness), providing sufficient spatial sampling to resolve capillaries. SALT images will be aligned using stereotaxic coordinates and undergo automated reconstruction and analysis using methods available using the FARSIGHT Toolkit. However, fully-automated segmentation algorithms designed are being developed to facilitate this process for whole-organ data sets. After segmentation, microvascular networks are quantified using the L-measure. This will allow quantitative comparison of microvascular features across the same regions of multiple brains. It is anticipated that significant architectural differences, such as changes in vascular branching, thinning, or the appearance of tortuosity, due to vascular remodeling will be easily detectable in these extracted features. Feature extraction will identify specific regions of interest (ROIs) for detailed multiplex analysis. SALT imaging may allow the study of a detailed map of region-specific neurovascular changes that will provide information about how these vascular networks change during aging and with amyloid accumulation.

Super-Resolution Characterization of the Neurovasculature

Rationale, Justification, and Feasibility.

Expansion microscopy (ExM) is a technique in which fluorophores on fixed specimens are linked to a swellable polymer matrix that is physically expanded, enabling super-resolution microscopy with conventional microscopes. The matrices currently used in these applications are hydrogels, which are optically clear, water-swollen polymers. Unfortunately, the significant mechanical fragility of most hydrogels is a significant barrier to their use in SALT. Techniques, such as increased crosslinking density and copolymerization have been used to increase the elastic modulus and mechanical strength of current hydrogels, but often compromise material characteristics such as transparency and hydrophobicity. Consequently, an optically transparent, mechanically strong hydrogel that is compatible with current expansion microscopy techniques is highly desirable and will eliminate constraints on imaging depth associated with the working distance of microscope objectives. In some embodiments, such ExM techniques may be compatible with SALT imaging systems and methods discussed previously. The abovenoted issues may be addressed by using strain-hardened interpenetrating polymer network (IPN) hydrogels to create compatible ExM matrices. An example of an IPN compatible with ExM is shown in FIG. 4B. The interpenetrating polymer network hydrogel proposed for these studies is based upon two different polymer networks that together create an optically clear, machinable gel. The first comprises a network of preformed hydrophilic non-ionic telechelic macromonomers, such as a high molecular weight polyethylene glycol diacrylamide (PEGDA), that can be chemically crosslinked at the end groups. Following formation of the primary network, a second crosslinked network comprises ionizable monomers (such as acrylate or polyacrylamide) is polymerized and chemically crosslinked. After formation of the hydrogels, an aqueous salt solution at neutral pH is used to ionize and swell the second network, resulting in a significant isotropic expansion of the hydrogel and a large increase in the elastic modulus. The resulting IPN gels are optically clear, machinable hydrogels with a high Young's modulus and high tensile strength that can be incorporated into the proposed SALT workflow. As IPN hydrogels can be formed with the same ionizable monomers, such as polyacrylamides, that are used in ExM hydrogels, IPNs are consequently compatible with the digestion and polymerization processes associated with expansion, and require minimal changes to current methods.

FIGS. 4A-4C respectively show (A) cortical blood vessels stained using FITC-lectin after paraffin processing; (B) ExM-compatible strain-hardened IPN hydrogel using PEGDA and acrylamide mix; and (C) ExM image of cortex stained for GFAP at 20×.

Optimization of Interpenetrating Network Hydrogels for SALT/ExM.

While preliminary data supports the feasibility of using these IPN hydrogels for SALT, the composition of IPNs for SALT/ExM may be further optimized by varying the compositions of different molecular weight PEGDA solutions and monomer (i.e, acrylamide solutions) to identify optimal compositions for lathe cutting. Additionally, it may be further confirm that IPN are fully compatible with cross-linking in ExM using glutaraldehyde or agents such as methacrylic acid N-hydroxy succinimidyl ester, or 6-((acryloyl)amino)hexanoic acid succinimidyl ester.

ExM/SALT Characterization of the Neurovascular Unit.

Once ROIs are identified as discussed previously, corresponding regions may be identified for high-resolution multiplex immunohistochemical analysis using ExM/SALT. Tissue may be stained with a panel of antibodies to identify cells associated with the neurovascular unit (i.e., markers for endothelial cells, pericytes, basement membranes, neurons, and astrocytes), to characterize the composition of the neurovasculature in regions of interest. In order to fully capture changes within ROIs, L-measure approaches may be used quantify morphological features, such as string vessels, alterations in collagen and perlecan associated with basement membrane, and altered distribution (or loss) of tight and adherens junctions. The high resolution images that are achievable with ExM is particularly useful for assessing the spatial distribution and localization of tight junction proteins, such as Claudin 3/5, Occludin, and ZO-1. To characterize the impact of amyloid pathology on the neurovascular system, tissue will be stained for Aβ40 (11A50; Covance), Aβ42 (12F4; Covance), total Aβ (4G8; Covance) along with oligomeric (A11; Millipore). ExM expansion of mouse brain tissue using multiple fluorescent labels has already been successfully verified (FIGS. 4A-4C).

Expected Outcomes and Alternative Approaches.

The compatibility of our antibodies and the markers for Aβ series of immunohistochemistry studies have been validated using antigen retrieval technique discussed in prior research, and these appear to be fully compatible for FRSIGHT analysis. Consequently, changes to basic staining procedures are not anticipated. However, it is anticipated that some fluorophores may display limited reactivity after paraffin processing; consequently, multiple fluorophores may need to be tested to identify those that work optimally with UV excitation. In instances when a particular antibody displayed reduced or minimal reactivity, markers with expected overlap (e.g, collagen IV; CD31; CD38) may be needed to delineate vessel structures. Similarly, although FARSIGHT greatly accelerates analysis, segmentation of vessels and other structure remains highly dependent upon the intrinsic algorithms. Given that amyloid takes multiple forms (diffuse, dense core, cerebral amyloid angiopathy), the current image segmentation routines used within may be refined in order to allow for efficient analysis.

SUMMARY

SALT and ExM-SALT may be useful methods for rapid characterization of the neurovasculature in Alzheimer's models, and may be further extended to studies of other tissues and whole organs. SALT will allow the creation of detailed cellular maps of the neurovasculature that can be used to profile and identify associations between proteins that would not be easily observable using conventional microscopy. Analytic approaches with FARSIGHT and Lmeasure will not only allow us to rapid test multiple hypothesis, but will also provide a comprehensive profile of the spatial relationships between different forms of AP, and impacts on the neurovasculature.

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described, including various combinations of the different elements, components, steps, features, or the like of the embodiments described, and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. A method for 3D imaging a tissue sample, the method comprising:
   treating a sample with an agent for imaging of the sample;
   embedding the sample in supporting matrix that is a circular cylinder;
   rotating the sample embedded in the supporting matrix for imaging and ablation;
   exciting surface regions of the sample with a UV source while the sample is rotated;
   continuously capturing images of the surface regions excited while the sample is rotated, wherein the images captured form a representation of a surface layer of the sample; and
   continuously ablating the surface layer of the sample embedded in the supporting matrix while the sample is rotated, wherein the surface layer is removed after being imaged.

2. The method of claim 1 further comprising:
   continuing the rotating, exciting, and capturing steps after ablating the surface layer to capture images of underlying layers of the sample; and
   continuing ablation of the underlying layers of the sample after being imaged, wherein rotating, exciting, capturing, and ablating steps for the underlying layers are repeated until the sample is completely imaged.

3. The method of claim 2 further comprising assembling the surface layer and the underlying layers to provide a 3D image of the sample.

4. The method of claim 1, wherein the capturing steps utilize microscopy with ultraviolet sectioning excitation (MUSE), selective plane illumination microscopy (SPIM), or expansion microscopy (ExM).

5. The method of claim 1, wherein the sample is rotated at a constant velocity.

6. The method of claim 1, wherein the agent for imaging is a fluorescent treatment or staining, fluorescent material, dye, or lectin.

7. The method of claim 1, wherein the supporting matrix is a wax, paraffin wax, or hydrogel.

8. The method of claim 7, wherein the hydrogel is a hydrophilic non-ionic telechelic macromonomer, ionizable monomer, or a combination thereof.

9. The method of claim 1, wherein the method allows for continuous and/or automated imaging of the sample.

10. The method of claim 1 further comprising the step of supplying a liquid interface in between the sample and image capturing device.

11. A 3D imaging system for imaging a sample, the system comprising:
- a UV source arranged to excite surface regions of a sample, wherein the sample is treated with an agent for imaging of the sample and embedded in a supporting matrix that is a circular cylinder;
- a rotary mechanism securing the sample, wherein the rotary mechanism rotates the sample for imaging and ablation;
- a camera for continuously capturing images of the surface regions excited by the UV source while the rotary mechanism rotates the sample, wherein the images form a representation of a surface layer of the sample; and
- an ablating mechanism positioned adjacent to the sample, wherein the ablating mechanism continuously removes the surface layer of the sample embedded in the supporting matrix while the sample is rotated after the images have been captured.

12. The system of claim 11, wherein after ablating the surface layer, the system continues to rotate the sample, capture images of underlying layers, and ablate the underlying layers until the entire sample has been imaged.

13. The system of claim 12, wherein the surface layer and underlying layers imaged are assembled to provide a 3D image of the sample.

14. The system of claim 11, wherein the camera is part of a microscopy with ultraviolet sectioning excitation (MUSE) system, selective plane illumination microscopy (SPIM) system, or expansion microscopy (ExM) system.

15. The system of claim 11, wherein the rotary mechanism operates at a constant velocity.

16. The system of claim 11, wherein the agent for imaging is a fluorescent treatment or staining, fluorescent material, dye, or lectin.

17. The system of claim 11, wherein the supporting matrix is a wax, paraffin wax, or hydrogel.

18. The system of claim 17, wherein the hydrogel is a hydrophilic non-ionic telechelic macromonomer, ionizable monomer, or a combination thereof.

19. The system of claim 11, wherein the system allows for continuous and/or automated imaging of the sample.

20. The system of claim 11 further comprising a liquid interface provided in between the sample and the camera.

* * * * *